Figure 1:
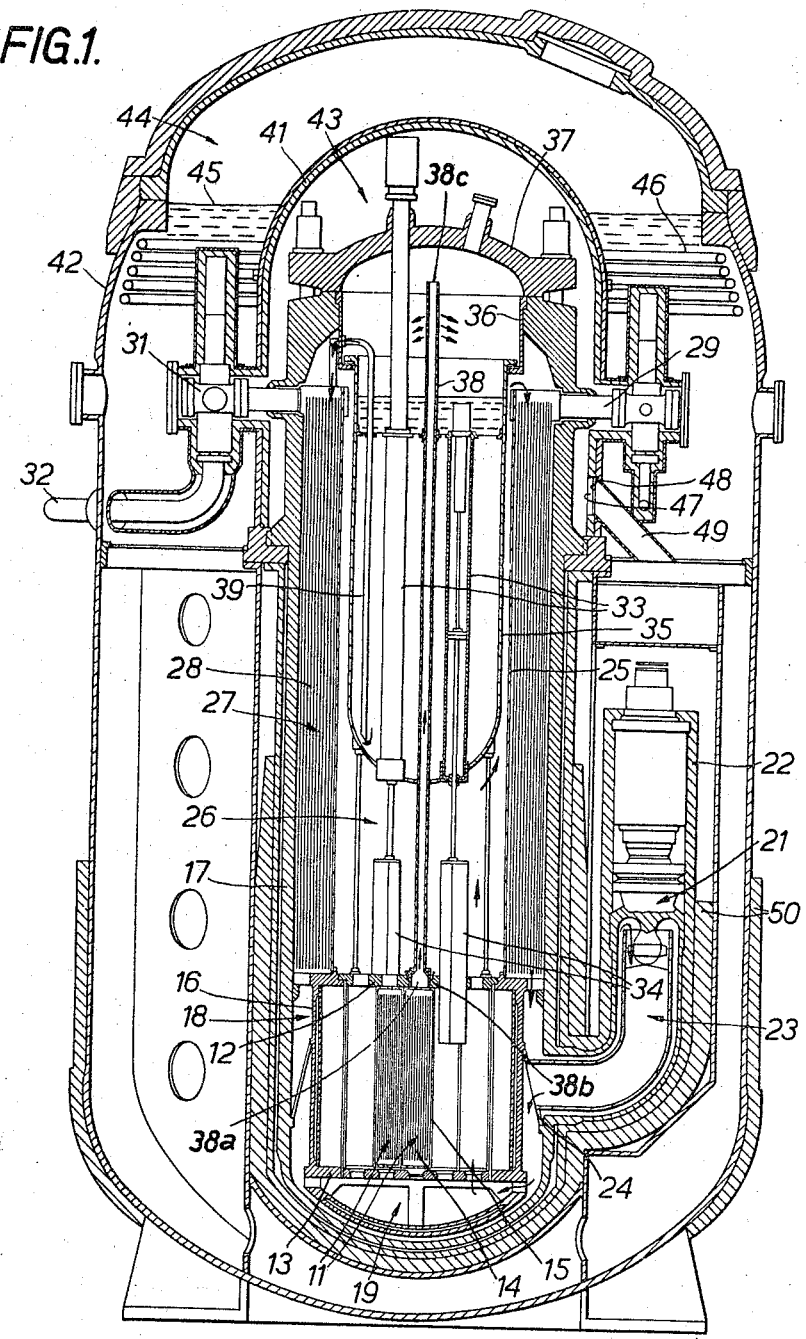

April 4, 1967          D. R. GRAIN          3,312,596

NUCLEAR REACTOR SYSTEM WITH INTERNAL PRESSURIZER

Filed Nov. 4, 1964

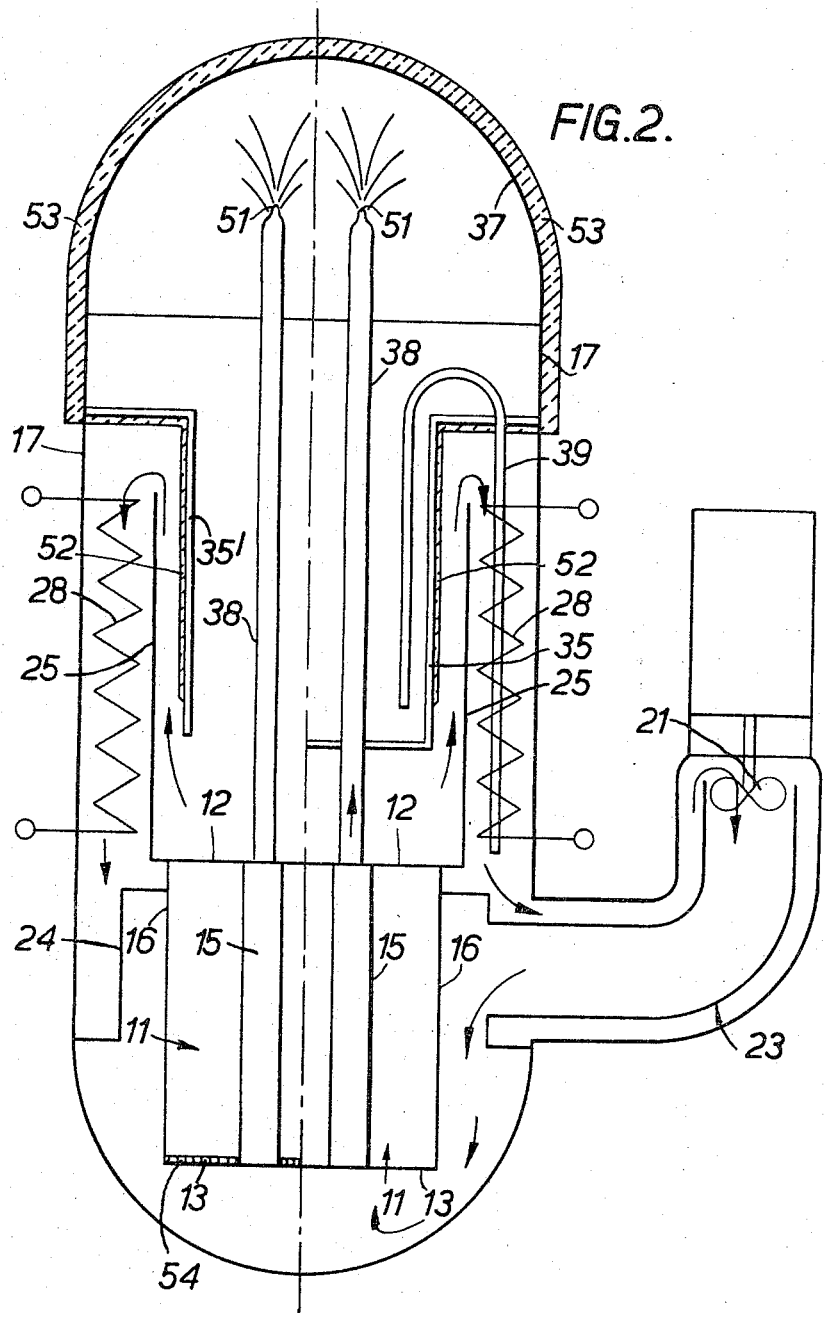

3,312,596
NUCLEAR REACTOR SYSTEM WITH
INTERNAL PRESSURIZER
Deryk Ronald Grain, Appleton, Warrington, England, assignor to United Kingdom Atomic Energy Authority, London, England
Filed Nov. 4, 1964, Ser. No. 408,869
Claims priority, application Great Britain, Nov. 12, 1963, 44,591/63; Jan. 14, 1964, 1,714/64
7 Claims. (Cl. 176—54)

This invention relates to nuclear reactors of the kind having a core of fuel elements cooled by a pressurised liquid coolant. An example of such a reactor is a pressurised water reactor in which pressurised water serves both to moderate and to cool the reactor.

The reactor coolant is pressurised with the object of reducing boiling of the coolant within the reactor core, since coolant boiling can have an adverse effect on the operational characteristics of the reactor due to both the effects on core and pump performance. To this end, the reactor coolant is subjected to a pressure above the saturation vapour pressure of the coolant at the highest temperature achieved by the coolant during its passage through the core. Such a pressure, related to the highest coolant temperature, is termed an over-pressure.

According to the invention a nuclear reactor having a core through which a pressurised liquid coolant is to be circulated embodies a pressuriser and a flow guide to isolate a pressurising stream of coolant in the core for delivery to the pressuriser, the arrangement being such that in operation the pressurising stream is hotter than the remaining coolant in the core and is alone capable of reducing boiling in the remaining coolant in the core.

In one of its aspects the invention provides a nuclear reactor having a core of fuel elements through which a pressurised liquid coolant is to be circulated with a flow guide to divide coolant in the core into a main stream and a pressurising stream, a flow restrictor by which the pressurising stream can be caused to flow slower and hotter than the main stream, and a pressuriser into which the pressurising stream is to flow and in which the pressurising stream is to develop a coolant pressure related to the temperature of the pressurising stream, which coolant pressure alone is to be applied to the main stream as an operational over-pressure.

Other aspects of the invention and its advantages will be understood from the following description, given by way of example, of a pressurised water reactor embodying the invention. Reference is made to the accompanying drawings, FIG. 1 of which is a sectional elevation of the reactor and FIG. 2 is a diagrammatic elevation, the left hand side of the drawing showing an arrangement of the invention and the right hand side showing an alternative arrangement, like the arrangement of FIG. 1.

The pressurised water reactor of FIG. 1 has an active core of nuclear fuel elements which are cooled by pressurised water acting also as moderator. The core comprises a set of upright fuel elements or assemblies 11 (two are shown) mounted between top and bottom perforated support grids 12, 13. Each assembly incorporates a number of elongate fuel pins 14 which are enclosed by a hexagonal water-tight shroud 15, the fuel pins being of enriched uranium oxide pellets stacked in stainless steel sheaths. The core is enclosed in a core baffle 16 (supporting the grids 12, 13) and located and supported in the lower closed end of a reactor vessel 17 with an annular duct 18 defined between the core baffle 16 and the reactor vessel 17 for circulation of reactor coolant water into a coolant inlet plenum 19 below the core. Coolant circulator means in the form of circulating pumps 21 mounted in casings 22 integral with and projecting externally of the reactor vessel 17 are connected by coaxial ducting 23 into the flow path between upper and lower portions of the annular duct 18, the portions being divided by a coolant baffle 24; these pumps 21 serve to circulate the coolant through the lower portion of the annular duct into the inlet plenum 19 and thence through channels defined by the fuel assemblies in the reactor core.

Above the reactor core a cylindrical baffle 25, mounted at its lower end from the baffle 16, divides the interior of the reactor vessel 17 into a central control plenum 26 and a coaxial annular heat exchange plenum 27. Heat exchangers 28 are located in the heat exchange plenum 27 by means of which heat can be transferred to a working fluid, or secondary coolant, for example water from which steam is raised. In the heat exchange plenum 27 the working fluid is passed through heat exchange tubes (represented diagrammatically by vertical lines in the plenum 27) whilst the reactor coolant circulates downwardly over the heat exchange tubes into the upper portion of the annular duct 18 surrounding the core. The working fluid is led into and away from the tubes of the heat exchangers by coaxial radial header assemblies 29 which project through the reactor vessel 17 at its upper end to terminate in valves 31 from which delivery pipes 32 are taken.

The control plenum 26 houses fluid-operated reactor control rod mechanisms 33 by which Y-section neutron-absorbing control rods 34 are movable into and out of the core between shrouds 15. Also located in the central control plenum 26 is a coolant pressuriser tank 35 which takes the form of a coaxial cylindrical tank which is closed at its lower end and open at its upper end and has a heat insulating skin. The lower sealed end of the tank 35 is located at a level below the middle of the vertical length of heat exchangers 28 whilst the open upper end of the tank 35 is sealed into the open upper end of the reactor vessel by means of a flanged connector 36. The connector 36 has an upper external flange sealed to the vessel 17 and a lower internal flange sealed to an external flange on the upper end of the tank 35. A lid 37 for the reactor vessel 17 also serves to close the pressuriser tank in a fluid-tight manner. An inlet 38 to the pressuriser tank 35 takes the form of an upright tube which passes in sealed fashion coaxially through the bottom of the pressuriser tank 35 and extends downwardly to communicate with a selected fuel element, namely the central fuel assembly 11 in the reactor core, the tube 38 having an inlet 38a and being sealed to the shroud 15 of this central fuel assembly 11 by means of an adaptor 38b. The tube 38 has a heat insulating skin. At its upper end, above the tank 35, the inlet tube 38 is closed off and apertured at its end 38c (spray nozzles being provided in the apertures) so that coolant water passed through the inlet tube from the central fuel assembly 11 is sprayed into the interior of tank 35. Outlets from the pressuriser tank 35 are provided by open ended dip tubes 39 (one of which is shown) which dip below the level of coolant in the tank. These dip tubes 39 rise within the tank 35 to a level above the upper end of the heat exchangers 28 (i.e. above the level of the headers 29), project through the tank at this level, and extend downwardly through the heat exchange plenum 27 to deliver coolant water from the pressuriser 35 into the reactor coolant in the heat exchange plenum 27 near the lower end of this plenum (i.e. just above the upper level of the reactor core). Adjacent the inlet 38a the tube 38 may have pressure release openings for communication with the plenum 26.

The reactor vessel 17 is housed in a close-fitting shroud 41 which is itself enclosed by an outer shell 42. The interspace 43 between the reactor vessel and the shroud is gas-filled whereas the interspace 44 between the shroud and the shell is filled with water to a level 45. Cooling coils 46 are mounted below the water level 45 within the shell 42. The shroud has an exhaust port 47 which is normally closed by a frangible disc 48; an exhaust duct 49 communicates with the port 47. In the event of a rupture of the reactor vessel leading to a release of radioactive, high temperature coolant water into the shroud, this released water is directed through the disc 48 and discharged below the level of water in the shell 42. This arrangement serves to counteract any pressure build-up within the shell. Furthermore, the water in the shell 42 acts as a neutron shield which is supplemented by additional shields 50 surrounding the lower regions of the reactor vessel.

During reactor operation coolant water circulated through the reactor core by the pumps 21 is divided into separated streams by the flow guide fuel assembly shrouds 15. The majority of the coolant, defined as a first or main coolant stream, rises through the core, being heated therein, into the control plenum 26 above the core and around the outside of the pressuriser tank 35 to the upper end of the reactor vessel 17, thence to flow downwardly through the heat exchange plenum 27, yielding its heat to the working fluid in the heat exchange tubes and into the upper portion of the annular duct 18 and thus into the pumps 21. A second or pressurising coolant stream is provided by coolant flowing through the central fuel assembly shroud 15. This pressurising stream rises in the communicating pressuriser inlet tube 38 and is sprayed through the nozzles at end 38c into the pressuriser tank 35; coolant water from the pressuriser tank is returned to the main stream by means of the dip tubes 39. The flow of the two streams is indicated by arrows.

Operation of the reactor in accordance with the invention, so as to avoid problems of pumping two-phase mixtures and to minimise in-core voidage, requires that the coolant water in the pressuriser inlet tube 38 should be hotter than coolant water at any point in the main coolant stream. This can be achieved in a number of ways and the way it is done in FIG. 1 is by the provision of coolant flow restriction on the outlet side of the assembly shroud 15 which is connected to the tube 38. The restriction is generated by the reduction in bore afforded by the inlet 38a and the dimensioning of the nozzles at the end 38c thus causing the pressurising stream to flow more slowly through the reactor core than the main stream and consequently to be heated to a higher temperature than the main stream. Once within the pressuriser tank 35, the pressurising stream builds up a steam pressure related to its temperature, a pressure which is therefore above the coolant saturation vapour pressure at any point in the main stream. A reservoir of coolant water collects in the bottom of the pressuriser tank 35 and this water is returned to the main stream by the dip tubes 39 which, in so doing, apply the pressure in the tank as an overpressure to the main stream of coolant, as it emerges from the reactor core.

The right hand side of FIG. 2 shows in purely diagrammatic form the general arrangement of the reactor of FIG. 1. The system gives an over-pressure related to the temperature of the pressurising stream, which in turn is achieved solely by means of utilising nuclear heating effects closely and rapidly matched to changing core conditions so that over-pressure does not rely on pressure derived from electrical heating systems with their slow response times or from gas over-pressure with the possibility of gas entrainment in the coolant, and does not rely on the need for a cold spray. The spraying of the pressurising stream through the nozzles (one of which is shown in the right hand side of FIG. 2 and designated 51) is advantageous in allowing the pressure in the pressuriser space at the upper end of the tank 35 to follow closely the pressure of the water entering the pressuriser tank. The pressurising stream and main stream can be considered to be in parallel with the core and heat exchanger thus keeping low the pressure drop for the pressurising stream. In keeping with the object of maintaining the pressurising stream at a higher temperature than the main stream, the tank 35 and pressure vessel 17 are provided with external heat insulating material, designated 52, 53 respectively.

The reactor shown diagrammatically on the left hand side of FIG. 2 is in most respects similar to that of FIG. 1, the main difference being that in FIG. 2 the pressuriser tank 35' is open at its lower end and the dip tubes 39 of FIG. 1 are not employed. This system operates substantially as described for that of FIG. 1, but provides a larger outflow area from the pressuriser. As the pressurising and main streams rejoin above the top of the core, this leads to a higher average inlet temperature to the heat exchangers than in the FIG. 1 system in which the two streams rejoin after the heat exchangers, but requires a higher pressure drop which is provided by additional restrictors 54. The heat exchangers 28 are shown diagrammatically in FIG. 2 as having upper and lower headers, but it is to be understood that these merely represent a convenient illustration of the coaxial header assemblies 29 of FIG. 1.

The invention has been described above with reference to the integral nuclear reactors shown in the drawings, that is to say reactors having both a reactor core and a heat exchanger enclosed in a pressure vessel, and is considered to be advantageous by virtue of the employment of limited nuclear heat to derive an over-pressure, the limited nuclear heat being obtained by localised coolant division at a selected position within the core to give a main coolant stream and a comparatively minor coolant pressurising stream, and having a high degree of control imparted to the flowing pressurising stream by reason of the flow guide and restrictor arrangement.

It is convenient to pass the pressurising coolant stream through a region of the core in which there is a neutron flux depression. It is then possible to run the pressurising stream at a higher temperature than the main stream whilst reducing the risk of burn-out of the fuel assembly which is cooled by the pressurising stream. The arrangement described above is suitable for a reactor core having a central flux depression but it is to be understood that other reactors in accordance with the invention may derive their pressurising streams from the peripheral regions of the core.

Furthermore, it is envisaged that reactors in accordance with the invention might have variable flow restrictors in the pressurising stream by which the degree of overpressure in the main stream could be regulated. Such variable restrictors might take the form of throttles in the pressuriser inlet tubes in addition to the apertures or in the inlet and/or outlet ends of the shrouds. Moreover, it is possible that a fuel assembly cooled by the pressurising stream will be modified to incorporate fuel pins of a smaller diameter or lesser enrichment than those in fuel assemblies cooled by the main stream. In this event, the total heat output of the modified assembly would be maintained at the level of the other assemblies by providing a greater number of fuel pins in the assembly. A fuel assembly modified in this way would have a lower heat flux for each fuel pin and would consequently have a greater operational margin against burn-out; this would render the assembly suitable for operation in the hot pressurising stream of coolant. Alternatively the fuel pins of the assembly may have special heat transfer surfaces to reduce burn-out risks.

In another alternative arrangement the pressurising stream of coolant is derived from a fraction of the coolant emerging from the core which is caused to make a second pass through an isolated part of the core so as to be increased in temperature.

I claim:

1. A nuclear reactor comprising a core, means for circulating a pressurised liquid coolant through the core, a pressuriser chamber, a flow guide extending into the core to isolate a pressurising stream of coolant in the core for delivery to the pressuriser chamber, restrictor means in the flow path defined by the flow guide whereby in operation the pressurising stream is hotter than the remaining coolant in the core and is alone capable of reducing boiling in the remaining coolant in the core, the chamber having a closed lower end, and a dip tube defining a path for flow of coolant from the inside to the outside of the chamber.

2. A nuclear reactor as claimed in claim 1, wherein the core and pressuriser chamber are housed in a reactor vessel also housing a heat exchanger for the pressurised liquid coolant.

3. A nuclear reactor comprising a core of fuel elements, means for circulating a pressurised liquid coolant through the core, a flow guide to divide coolant in the core into a main stream and a pressurising stream, a flow restrictor whereby the pressurising stream can be caused to flow slower and hotter than the main stream, a pressuriser chamber into which the pressurising stream is to flow and in which the pressurising stream is to develop a coolant pressure, related to the temperature of the pressurising stream, to be applied alone to the main stream as an operational over-pressure, the chamber having a closed lower end, and a dip tube defining a path for flow of coolant from the inside to the outside of the chamber.

4. A nuclear reactor as claimed in claim 3, wherein the core and pressuriser are housed in a reactor vessel also housing a heat exchanger for the pressurised liquid coolant.

5. A nuclear reactor as claimed in claim 1, wherein the pressuriser chamber comprises a tank having an inlet communicating with a central fuel element of the core.

6. A nuclear reactor as claimed in claim 2, wherein the pressuriser comprises a tank having an inlet communicating with a central fuel element of the core.

7. A nuclear reactor as claimed in claim 4, wherein the dip tube extends externally of the chamber over the length of the heat exchanger.

References Cited by the Examiner

UNITED STATES PATENTS

| | | | |
|---|---|---|---|
| 2,990,349 | 6/1961 | Roman | 176—61 |
| 3,150,051 | 9/1964 | Ammon | 176—53 |
| 3,151,034 | 9/1964 | Douglass et al. | 176—53 |

FOREIGN PATENTS

| | | |
|---|---|---|
| 629,810 | 10/1963 | Belgium. |
| 613,363 | 1/1961 | Canada. |

L. DEWAYNE RUTLEDGE, *Primary Examiner.*